(12) United States Patent
Yan (10) Patent No.: US 10,887,332 B2
(45) Date of Patent: Jan. 5, 2021

(54) CONTROL OF UNWANTED NETWORK TRAFFIC

(71) Applicant: Nokia Technologies Oy, Espoo (FI)

(72) Inventor: Zheng Yan, Shaanxi (CN)

(73) Assignee: NOKIA TECHNOLOGIES OY, Espoo (FI)

( * ) Notice: Subject to any disclaimer, the term of this patent is extended or adjusted under 35 U.S.C. 154(b) by 128 days.

(21) Appl. No.: 15/574,451

(22) PCT Filed: Jun. 15, 2015

(86) PCT No.: PCT/CN2015/081430
§ 371 (c)(1),
(2) Date: Nov. 15, 2017

(87) PCT Pub. No.: WO2016/201593
PCT Pub. Date: Dec. 22, 2016

(65) Prior Publication Data
US 2018/0139223 A1    May 17, 2018

(51) Int. Cl.
*H04L 29/06* (2006.01)
*G06F 21/55* (2013.01)
*H04L 9/00* (2006.01)
*H04L 9/32* (2006.01)
*H04L 12/26* (2006.01)

(52) U.S. Cl.
CPC ........ *H04L 63/1425* (2013.01); *G06F 21/552* (2013.01); *H04L 9/006* (2013.01); *H04L 9/008* (2013.01); *H04L 9/3247* (2013.01); *H04L 43/062* (2013.01); *H04L 63/0428* (2013.01); *H04L 63/1416* (2013.01); *H04L 63/1441* (2013.01); *H04L 63/0421* (2013.01)

(58) Field of Classification Search
None
See application file for complete search history.

(56) References Cited

U.S. PATENT DOCUMENTS 7,856,100 B2    12/2010  Wang et al.
8,498,415 B2     7/2013  Sy
(Continued)

FOREIGN PATENT DOCUMENTS

CA    2763201 A1    2/2011
CN    102419808 A   4/2012
(Continued)

OTHER PUBLICATIONS

Applied Cryptography, Second Edition by Bruce Schneier. Publisher: John Wiley & Sons, Inc. Year: 1996 (Year: 1996).*
(Continued)

*Primary Examiner* — Madhuri R Herzog
(74) *Attorney, Agent, or Firm* — Squire Patton Boggs (US) LLP (57) ABSTRACT

According to embodiments of the present invention, trust evaluation is performed on network entities including a host and a network node with privacy preservation to determine an unwanted traffic source. The trust evaluation is based on detection reports from the hosts and monitoring reports from the network nodes. The network nodes do not know contents of the detection reports, and an entity which executes the trust evaluation does not know real identifiers of the hosts and network nodes.

17 Claims, 8 Drawing Sheets

(56) References Cited

U.S. PATENT DOCUMENTS

| | | | |
|---|---|---|---|
| 8,590,014 B1* | 11/2013 | Haugsnes | G06F 21/31 726/3 |
| 8,646,038 B2* | 2/2014 | Blumfield | H04L 63/1441 726/22 |
| 8,832,832 B1 | 9/2014 | Visbal | |
| 8,843,997 B1 | 9/2014 | Hare | |
| 9,960,975 B1* | 5/2018 | Van Horenbeeck | H04L 63/1416 |
| 2008/0086773 A1* | 4/2008 | Tuvell | G06F 21/55 726/23 |
| 2010/0154059 A1* | 6/2010 | McNamee | H04L 43/00 726/23 |
| 2011/0110220 A1 | 5/2011 | Breslin et al. | |
| 2011/0154016 A1 | 6/2011 | Niccolini et al. | |
| 2012/0121080 A1* | 5/2012 | Kerschbaum | H04L 9/0643 380/28 |
| 2013/0242743 A1 | 9/2013 | Thomas et al. | |
| 2013/0263260 A1 | 10/2013 | Mahaffey et al. | |
| 2013/0298230 A1* | 11/2013 | Kumar | G06F 21/52 726/22 |
| 2013/0347103 A1 | 12/2013 | Veteikis et al. | |
| 2014/0237593 A1 | 8/2014 | Chen et al. | |
| 2015/0089568 A1 | 3/2015 | Sprague et al. | |
| 2015/0106910 A1 | 4/2015 | Krishnamurthy | |
| 2016/0205114 A1* | 7/2016 | Yan | H04L 63/08 713/168 |

FOREIGN PATENT DOCUMENTS

| | | | |
|---|---|---|---|
| CN | 102656587 A | 9/2012 | |
| CN | 103180862 A | 6/2013 | |
| CN | 103825743 A | 5/2014 | |
| GB | 2452555 A | 3/2009 | |
| WO | 2013/189723 A1 | 12/2013 | |
| WO | WO-2015024173 A1 * | 2/2015 | H04W 12/10 |

OTHER PUBLICATIONS

S. Peter, D. Westhoff and C. Castelluccia, "A Survey on the Encryption of Convergecast Traffic with In-Network Processing," in IEEE Transactions on Dependable and Secure Computing, vol. 7, No. 1, pp. 20-34, Jan.-Mar. 2010, doi: 10.1109/TDSC.2008.23. (Year: 2010).*

Extended European Search Report received for corresponding European Patent Application No. 15895166.5, dated Nov. 19, 2018, 7 pages.

Yan et al., "A Survey on Trust Management for Internet of Things", Journal of Network and Computer Applications, vol. 42, Jun. 2014, pp. 120-134.

Zheleva et al., "Trusting Spam Reporters: A Reporter-Based Reputation System for Email Filtering", ACM Transactions on Information Systems, vol. 27, No. 1, Article No. 3, Dec. 2008, pp. 1-27.

Zhang et al., "Automatic Seed Set Expansion for Trust Propagation Based Anti-Spamming Algorithms", Proceedings of the eleventh international workshop on Web information and data management (WIDM), Nov. 2, 2009, pp. 31-38.

Liu et al., "Incorporating Accountability Into Internet Email", Proceedings of the 2009 ACM symposium on Applied Computing (SAC), Mar. 8-12, 2009, pp. 875-882.

McGibney et al., "A Trust Overlay Architecture and Protocol for Enhanced Protection against Spam", The Second International Conference on Availability, Reliability and Security (ARES), 2007, Apr. 10-13, 2007, 8 pages.

Zhang et al., "IPGroupRep: A Novel Reputation Based System for Anti-Spam", Symposia and Workshops on Ubiquitous, Autonomic and Trusted Computing, 2009, pp. 513-518.

Tang et al., "Support Vector Machines and Random Forests Modeling for Spam Senders Behavior Analysis", IEEE Global Telecommunications Conference, Nov. 30-Dec. 4, 2008, pp. 1-5.

Janecek et al., "Multi-Level Reputation-Based Greylisting", Third International Conference on Availability, Reliability and Security (ARES), Mar. 4-7, 2008, pp. 10-17.

Jianzhong et al., "MailTrust: A Mail Reputation Mechanism Based on Improved TrustGuard", International Conference on Communications and Mobile Computing (CMC), Apr. 12-14, 2010, pp. 218-222.

Bi et al., "A Trust and Reputation Based Anti-SPIM Method",The 27th Conference on Computer Communications IEEE INFOCOM, Apr. 13-18, 2008, pp. 371-375.

Wu et al., "Topical TrustRank: Using Topicality to Combat Web Spam", In Proceedings of the 15th International World Wide Web Conference, May 23-26, 2006, 10 pages.

Page et al., "The Page Rank Citation Ranking: Bringing Order to the Web", Technical Report, Jan. 29, 1998, pp. 1-17.

Liu et al., "Browse Rank: Letting Web Users Vote for Page Importance", In Proc. of SIGIR, Jul. 20-24, 2008, pp. 451-458.

Gyongyi et al., "Combating Web Spam With trustrank", Proceedings of the Thirtieth international conference on Very large data bases, vol. 30, Aug. 31-Sep. 3, 2004, pp. 576-587.

Kolan et al., "Socio-Technical Defense Against Voice Spamming", Journal ACM Transactions on Autonomous and Adaptive Systems, vol. 2, No. 1, Article No. 2, Mar. 2007, pp. 1-44.

Pavlov et al., "Supporting Privacy in Decentralized Additive Reputation Systems", International Conference on Trust Management iTrust, 2004, 11 pages.

Yao et al., "Private Distributed Scalar Product Protocol With Application to Privacy-Preserving Computation of Trust", IFIPTM: IFIP International Conference on Trust Management, vol. 238, 2007, pp. 1-16.

Melchor et al., "A Collusion-Resistant Distributed Scalar Product Protocol with Application to Privacy-Preserving Computation of Trust", Eighth IEEE International Symposium on Network Computing and Applications, Jul. 9-11, 2009, pp. 140-147.

Nithyanand et al., "Fuzzy Privacy Preserving Peer-to-Peer Reputation Management", IACR Cryptology ePrint Archive, Jan. 2009, 10 pages.

Chen et al., "TruSMS: A Trustworthy SMS Spam Control System Based on Trust Management", Future Generation Computer Systems, vol. 49, Aug. 2014, 17 pages.

Yan et al., "A Generic Solution for Unwanted Traffic Control Through Trust Management", The New Review of Hypermedia and Multimedia—Cyber, Physical and Social Computing, vol. 20, No. 1, Mar. 2014, pp. 25-51.

International Search Report and Written Opinion received for corresponding Patent Cooperation Treaty Application No. PCT/CN2015/081430, dated Mar. 16, 2016, 11 pages.

Chinese Office Action issued in corresponding Chinese Patent Application No. 201580080882.X dated Nov. 25, 2019.

* cited by examiner

CONTROL OF UNWANTED NETWORK TRAFFIC

RELATED APPLICATION

This application was originally filed as PCT Application No. PCT/CN2015/081430 filed Jun. 15, 2015.

TECHNICAL FIELD OF THE INVENTION

The present invention relates to network security field, and more particularly to control of unwanted network traffic based on trust management.

BACKGROUND OF THE INVENTION

With rapid development and wide use of network technologies, there has provided numerous services or applications in the Internet or various communication networks to make users benefit from them. However there also exists an amount of unwanted traffic in the Internet, such as spam, malware, vicious intrusions, etc. Such the unwanted traffic brings trouble to the users, leads to heavy burden on network transmission and influences network security. Consequently, an efficient solution to control the unwanted traffic in the Internet or communication networks including the existing and future mobile/wireless network is necessary and crucial.

In order to control the unwanted network traffic, technologies like firewalls, network monitoring, and intrusion detection systems (IDS) are widely developed and used to control spam, malware, or Distributed Denial of Service (DDoS) attacks. Another technology for controlling unwanted network traffic is based on trust and reputation management, i.e. trust evaluation on each network entity.

In recent years a number of solutions to control unwanted traffic via trust and reputation management have been proposed for different types of unwanted traffic, e.g. email spam, Instant Messaging Spam (spim), Spam over Internet Telephony (SPIT), and web page spam. But the trust and reputation management relates to unwanted traffic detection reporting or intrusion reporting by a reporter such as a network host or a network terminal, which may require private information of the reporter, thus the privacy of the reporter is impacted and cannot be preserved.

As the privacy preservation for the network host is paid more and more attention, a new trust management with privacy preservation is expected for the unwanted traffic control.

SUMMARY OF THE INVENTION

The following presents a simplified summary of the invention in order to provide a basic understanding of some aspects of the invention. This summary is not an extensive overview of the invention. It is not intended to identify key or critical elements of the invention or to delineate the scope of the invention. The following summary merely presents some concepts of the invention in a simplified form as a prelude to the more detailed description provided below.

The present invention is directed to methods for control of unwanted network traffic and apparatus thereof.

According to one embodiment, there is provided a method for control of unwanted network traffic. In the method, unwanted traffic flowing through a host which subscribes to a network node is detected. The detection result for the unwanted traffic is encrypted with a homomorphic encryption key that is unknown to the network node. Then a detection report is generated, the detection report containing a first identifier of the host, a second identifier of a source host which transmits the unwanted traffic to the host, a content identifier identifying content of the unwanted traffic, and the encrypted detection result. At last the detection report is signed by means of a Public Key Infrastructure (PKI) public/private key pair of the host.

According to another embodiment, there is provided a method for control of unwanted network traffic. In the method, detection reports with a digital signature are received at a network node and from hosts which subscribe to the network node, wherein the detection report contains a first identifier of the host, a second identifier of a source host which transmits unwanted traffic to the host, a content identifier identifying content of the unwanted traffic, and an encrypted detection result for the unwanted traffic, and the encrypted detection result is based on a homomorphic encryption key which is unknown to the network node. The digital signature of the respective detection reports is verified. Then the encrypted detection results of the detection reports related to the same source host are aggregated by applying homomorphic based calculation, and a suspicious source host to be monitored is determined based on the aggregation result.

According to another embodiment, there is provided a method for control of unwanted network traffic. In the method, a report is received from a network node. In response to the report containing an aggregation result of encrypted detection results regarding the same source host and an anonymous identifier of the source host, the encrypted detection results being based on a homomorphic encryption key which is unknown to the network node, the aggregation result is decrypted with a homomorphic decryption key which is paired with the homomorphic encryption key. Then it is determined whether the source host is a suspicious source host to be monitored based on the decrypted aggregation result, and the determination result and the anonymous identifier of the source host are transmitted to the network node. In response to the report being a monitoring report with a digital signature, the monitoring report containing a third identifier of the network node, a monitoring result for a suspicious source host, a fourth identifier of the suspicious source host, and encrypted detection results related to the suspicious source host, the digital signature is verified. Then the encrypted detection results are decrypted with the homomorphic decryption key. A global trust of the suspicious source host is evaluated based on the detection results and the monitoring result. In response to the global trust satisfying a third condition, it is determined that the suspicious source host is the true unwanted traffic source. At last the global trust and an identifier of the true unwanted traffic source are transmitted to the network node. In the method, the third identifier is an anonymous identifier of the network node, and the fourth identifier is an anonymous identifier of the suspicious source host.

According to another embodiment, there is provided an apparatus for control of unwanted network traffic. The apparatus comprises at least one processor and at least one memory including computer program code, the at least one memory and the computer program code configured to, with the at least one processor, cause the apparatus to perform at least the following: detect unwanted traffic flowing through a host which subscribes to a network node; encrypt the detection result for the unwanted traffic with a homomorphic encryption key which is unknown to the network node; generate a detection report which contains a first identifier of the host, a second identifier of a source host which transmits the unwanted traffic to the host, a content identifier identifying content of the unwanted traffic, and the encrypted detection result; and sign the detection report by means of a Public Key Infrastructure (PKI) public/private key pair of the host.

According to another embodiment, there is provided an apparatus for control of unwanted network traffic. The apparatus comprises at least one processor and at least one memory including computer program code, the at least one memory and the computer program code configured to, with the at least one processor, cause the apparatus to perform at least the following: receive, at a network node and from hosts which subscribe to the network node, detection reports with a digital signature, the detection report containing a first identifier of the host, a second identifier of a source host which transmits unwanted traffic to the host, a content identifier identifying content of the unwanted traffic, and an encrypted detection result for the unwanted traffic, the encrypted detection result being based on a homomorphic encryption key which is unknown to the network node; verify the digital signature of the respective detection reports; aggregate the encrypted detection results of the detection reports regarding the same source host; and determine a suspicious source host to be monitored based on the aggregation result.

According to another embodiment, there is provided an apparatus for control of unwanted network traffic. The apparatus comprises at least one processor and at least one memory including computer program code, the at least one memory and the computer program code configured to, with the at least one processor, cause the apparatus to perform at least the following: receive, from a network node, a report; in response to the report containing an aggregation result of encrypted detection results regarding the same source host and an anonymous identifier of the source host, the encrypted detection results being based on a homomorphic encryption key which is unknown to the network node, decrypt the aggregation result with a homomorphic decryption key which is paired with the homomorphic encryption key; determine whether the source host is a suspicious source host to be monitored based on the decrypted aggregation result; transmit the determination result and the anonymous identifier of the source host to the network node; in response to the report being a monitoring report with a digital signature, the monitoring report containing a third identifier of the network node, a monitoring result for a suspicious source host, a fourth identifier of the suspicious source host, and encrypted detection results regarding the suspicious source host, verify the digital signature; decrypt the encrypted detection results with the homomorphic decryption key; evaluate a global trust of the suspicious source host, based on the detection results and the monitoring result; in response to the global trust satisfying a third condition, determine the suspicious source host is the true unwanted traffic source; and transmit the global trust and an identifier of the true unwanted traffic source to the network node. In the apparatus, the third identifier is an anonymous identifier of the network node, and the fourth identifier is an anonymous identifier of the suspicious source host.

According to another embodiment, there is provided a computer program product, which includes one or more sequences of one or more instructions which, when executed by one or more processors, cause an apparatus to at least perform the steps of the above method for unwanted network traffic control.

According to another embodiment, there is provided an apparatus for control of unwanted network traffic. The apparatus comprises means for detecting unwanted traffic flowing through a host which subscribes to a network node, means for encrypting the detection result for the unwanted traffic with a homomorphic encryption key which is unknown to the network node, means for generating a detection report which contains a first identifier of the host, a second identifier of a source host which transmits the unwanted traffic to the host, a content identifier identifying content of the unwanted traffic, and the encrypted detection result, and means for signing the detection report by means of a Public Key Infrastructure (PKI) public/private key pair of the host.

According to another embodiment, there is provided an apparatus for control of unwanted network traffic. The apparatus comprises means for receiving, at a network node and from hosts which subscribe to the network node, detection reports with a digital signature, the detection report containing a first identifier of the host, a second identifier of a source host which transmits unwanted traffic to the host, a content identifier identifying content of the unwanted traffic, and an encrypted detection result for the unwanted traffic, the encrypted detection result being based on a homomorphic encryption key which is unknown to the network node, means for verifying the digital signature of the respective detection reports, means for aggregating the encrypted detection results of the detection reports regarding the same source host by applying homomorphic based calculation, and means for determining a suspicious source host to be monitored based on the aggregation result.

According to another embodiment, there is provided an apparatus for control of unwanted network traffic. The apparatus comprises means for receiving, from a network node, a report, means for, in response to the report containing an aggregation result of encrypted detection results regarding the same source host and an anonymous identifier of the source host, the encrypted detection results being based on a homomorphic encryption key which is unknown to the network node, decrypting the aggregation result with a homomorphic decryption key which is paired with the homomorphic encryption key, means for determining whether the source host is a suspicious source host to be monitored based on the decrypted aggregation result, means for transmitting the determination result and the anonymous identifier of the source host to the network node, means for, in response to the report being a monitoring report with a digital signature, the monitoring report containing a third identifier of the network node, a monitoring result for a suspicious source host, a fourth identifier of the suspicious source host, and encrypted detection results regarding the suspicious source host, verifying the digital signature, means for decrypting the encrypted detection results with the homomorphic decryption key, means for evaluating a global trust of the suspicious source host, based on the detection results and the monitoring result, means for, in response to the global trust satisfying a third condition, determining the suspicious source host is the true unwanted traffic source, and means for transmitting the global trust and an identifier of the true unwanted traffic source to the network node. The third identifier is an anonymous identifier of the network node, and the fourth identifier is an anonymous identifier of the suspicious source host.

Generally, all terms used in this specification are to be interpreted according to their ordinary meaning in the technical field, unless explicitly defined otherwise herein. All references to "a/an/the [element, device, apparatus, component, means, step, etc]" are to be interpreted openly as referring to at least one instance of said element, device, apparatus, component, means, step, etc., unless explicitly stated otherwise. The steps of any method disclosed herein do not have to be performed in the exact order disclosed, unless explicitly stated.

Those skilled in the art will appreciate that the above is merely an introduction to the subject matter described in more detail below. Other objectives, features and advantages of the present invention will appear from the following detailed disclosure, from the attached dependent claims as well as from the drawings.

BRIEF DESCRIPTION OF THE DRAWINGS

A more complete understanding of the present invention and certain advantages thereof may be acquired by referring to the following description in consideration of the accompanying drawings, in which like reference numbers indicate like features, and wherein.

DETAILED DESCRIPTION OF THE EMBODIMENTS

In the following description of the various illustrative embodiments, reference is made to the accompanying drawings, which form a part thereof, and in which are shown by way of illustration various exemplary embodiments in which the invention may be practiced. It is to be understood that other embodiments may be utilized and structural and functional modifications may be made without departing from the scope of the present invention.

Embodiments of the method for control of unwanted network traffic of the present invention are based on trust management for network entities in a network system such as Internet, communication network, mobile cellular networks, etc. and take into account privacies of the network entities.

Figure 1:
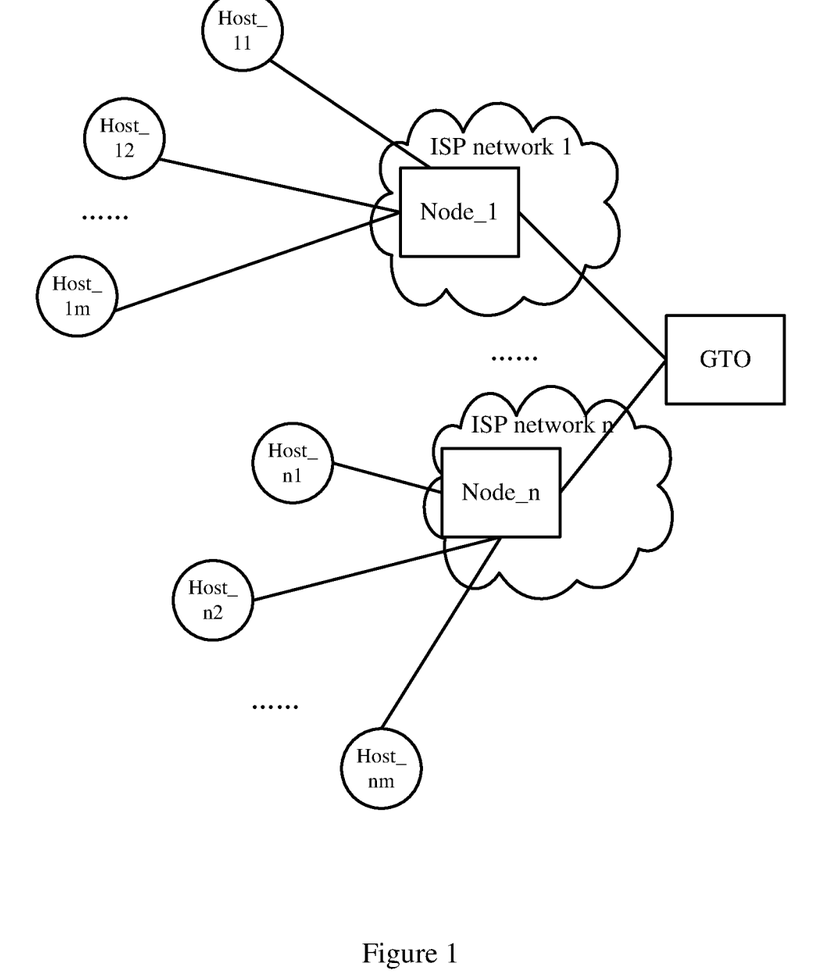
FIG. 1 is an exemplary diagram of a system in which the methods for control of unwanted network traffic of embodiments of the present invention can be implemented.

FIG. 1 shows an example of a network system in which the embodiments of the method for control of unwanted network traffic can be implemented. As shown in FIG. 1, the network system comprise at least one host Host_l1, Host_l2, . . . , Host_lm, . . . , Host_n1, Host_n2, . . . , Host_nm, at least one network node Node_1, . . . , Node_n, and an entity called Global Trust Operator (GTO) which can execute the trust management. The host and the network node can be collectively called as network entity.

In the embodiments, the host can be any network device that subscribes to the network node and connects to the network node to access services provided by the network node. The host can be for example a computer such as personal computer, laptop, notebook and like, a communication terminal such as mobile phone, smart phone, etc.

The network node can be a node of a service provider network, such as an Internet Service Provider (ISP) network, which provides the service to its subscribed hosts.

The GTO is an entity that is different from the network node and can communicate with the network node. The GTO behaves as an authorized party and conducts computation honestly. In an embodiment, the GTO can be deployed as a cloud computing service by Cloud Service Provider.

The embodiments of the method for control of unwanted network traffic according to the present invention can be executed at or by the host, the network node and the entity as shown in FIG. 1 cooperatively. During the control of unwanted network traffic, in an embodiment, at the host, a detection report of the unwanted traffic is applied with partial Homomorphic Encryption (HE) scheme and transmitted to the network node. In another embodiment, at the network node, the detection reports are used to find suspicious unwanted traffic sources with the support of the GTO. The network node can then monitor the traffic of the suspicious sources and transmit a monitoring report together with the detection reports to the GTO. In another embodiment, the GTO can execute trust evaluation on the hosts and the network node based on the monitoring reports and detection reports to determine the true unwanted traffic sources.

In the embodiments of the present invention, the network node should not know contents of the detection report from the host, but knows real identifiers of the hosts. The GTO should not know real identifiers of the hosts and network node, but should know the contents of the detection report. In this way, the privacy preservation of the network entity can be achieved.

In one implementation, the network system as shown in FIG. 1 can be based on Software Defined Networking. In this case, the traffic monitoring performed at the host and network node can be implemented at a data plane, and the trust evaluation and determination of unwanted traffic source performed at the GTO can be implemented at a control plane.

Next the methods for control of unwanted network traffic executed at the host, network node and GTO respectively will be described in detail in conjunction with the figures.

Figure 2:
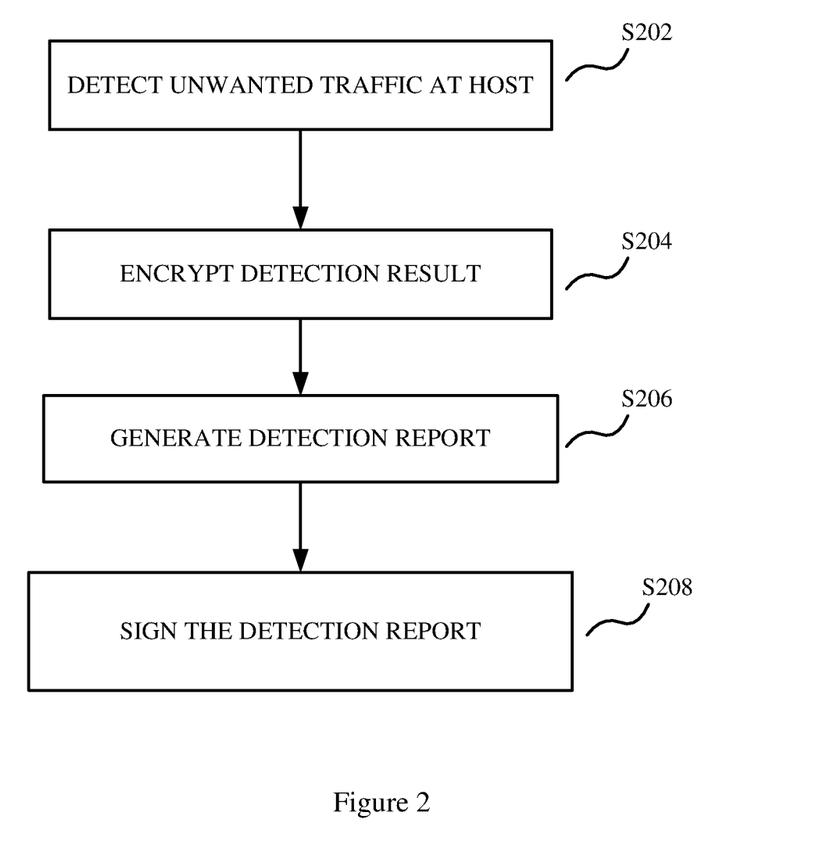
FIG. 2 is a flowchart illustrating the method for control of unwanted network traffic according to a first embodiment of the present invention.

FIG. 2 shows a flowchart illustrating the method for control of unwanted network traffic according to a first embodiment of the present invention. In this embodiment, the method is executed at or by the host.

As shown in FIG. 2, at step S202, unwanted traffic flowing through the host is detected. In this embodiment, the detection can be performed by monitoring local traffic of the host, monitoring host behavior on the local traffic, and checking content similarity of the local traffic. In general, the traffic is constituted by a plurality of contents, and for the sake of simplicity, the terms "traffic" and "content" could be alternatively used hereinafter.

Figure 3:
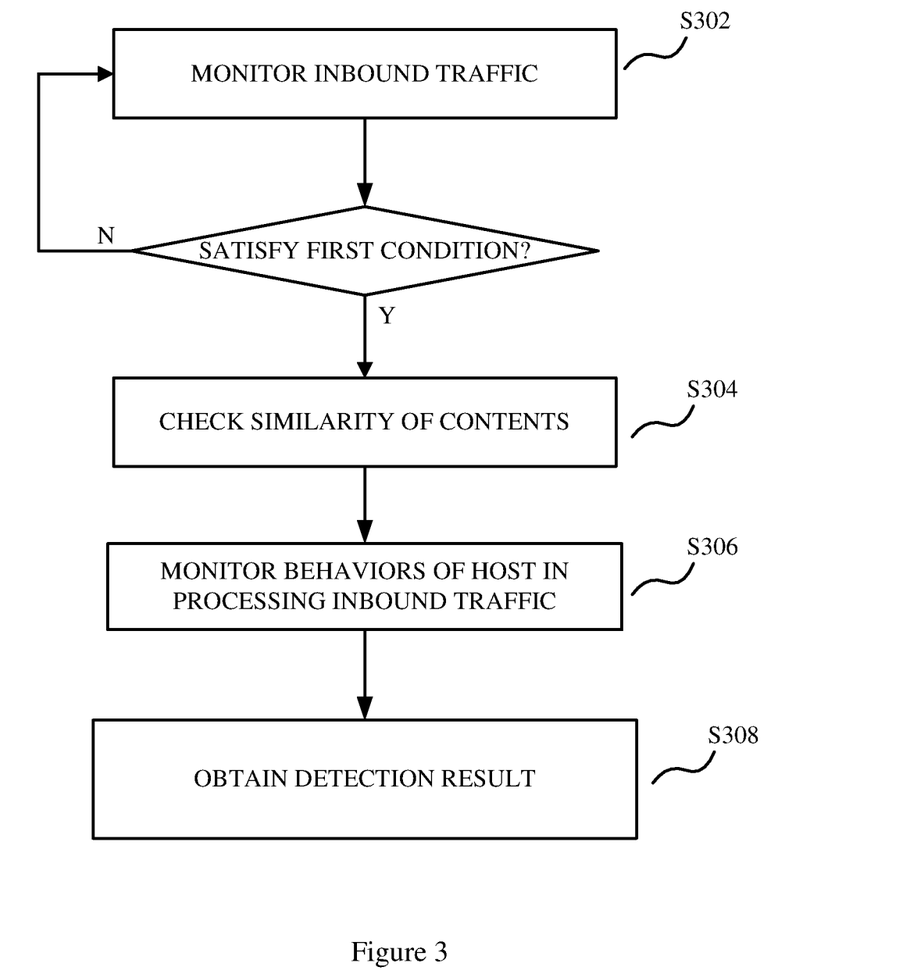
FIG. 3 is a flowchart illustrating a procedure of detecting unwanted traffic as shown in FIG. 2.

FIG. 3 shows a schematic flowchart of a process of detecting unwanted traffic at the host. As shown in FIG. 3, at step S302, inbound traffic of the host is monitored. The purpose of monitoring the inbound traffic of the host $U_k$ (k=1, 2, . . . , K) is to detect if the host $U_k$ has been intruded. The increase of the inbound traffic of the host indicates the possibility of being intruded.

In an embodiment, the traffic monitoring result can be represented by a first indicator $\varphi^k$ as below:

$$\varphi^k = |1 - 2f\{d_t[tr_k^{in}(t)]\}| \quad (1)$$

wherein $tr_k^{in}(t)$ represents the inbound traffic of the host $U_k$ at time t, $$d_t\{g(t)\} = \frac{g(t) - g(\tau)}{\tau}, (\tau \to 0),$$

$f(\bullet)$ represents a Sigmoid function. So the first indicator $\varphi^k$ is normalized into an interval (0, 1). The bigger the first indicator $\varphi^k$ is, the more probably the host $U_k$ is intruded.

Then at step S304, if the first indicator $\varphi^k$ satisfies a first condition, for example, the first indicator $\omega^k$ is not less than a first predetermined threshold THR1 for triggering similarity check, similarity of contents of the inbound traffic is checked. In most network intrusions, similar contents could be sent many times to the same host. The similarity of contents received by the host can reflect a possibility of being unwanted contents in an extent.

In an embodiment, for a set of similar sized contents $E_k = \{e_i^k\} i = \{1, \ldots, I\}$ received by the host $U_k$ within a time window $w = \lfloor t - T/2, t + T/2 \rfloor$, wherein T is a time window used to normalize content processing time, the similarity of contents $E_k$ can be calculated as:

$$\text{sim\_in}_i^k = \theta(I)/I - 1 \sum_{i' \neq i}^{I} (1 - |e_i^k - e_{i'}^k|) \quad (2)$$

wherein $|e_i^k - e_{i'}^k|$ is the difference between the content $e_i^k$ and the content $e_{i'}^k$ and can be calculated based on a semantic relevance measure, $\theta(I)$ is Rayleigh cumulative distribution function, i.e. $\theta(I) = \left\{1 - \exp\left(\frac{-I^2}{2\sigma^2}\right)\right\}$.

In addition, $e_i^k$ can be a hash code of the ith content received by the host $U_k$.

As the host $U_k$ could receive multiple sets of similar contents, the similarity of the inbound traffic received by the host $U_k$ can be calculated as below by considering all the similar contents:

$$\text{sim\_in}^k = \frac{1}{M'} \sum_{M'} \left[\theta(I)/I - 1 \sum_{i' \neq i}^{I} (1 - |e_i^k - e_{i'}^k|)\right] \quad (3)$$

wherein M' is the number of the sets of similar contents. The bigger the number of the similar contents in the set, the more possible it is that the similar content is unwanted. In the formula (2), (3), the Rayleigh cumulative distribution function $\theta(I)$ is used to consider the influence of the integer 1.

On the other hand, if the first indicator $\phi^k$ is less than the first predetermined threshold THR1, the host continues to monitor its inbound traffic.

At step S306, the behaviors of the host $U_k$ in processing the inbound traffic are monitored. The behaviors of the host in processing the received traffic can imply that the host wants the content or dislikes the content. So the monitoring result about the behavior of the host can be applied to indicate whether the traffic is wanted subjective to personal needs.

In an embodiment, the behavior monitoring result can be represented by a second indicator $\tau_i$ as below:

$$\tau_i = 1 - d_t^i - r_t^i / T, \text{ if } d_t^i - r_t^i < T \quad (4)$$

wherein $d_t^i$ represents the discarding time of the content $e_i^k$, $r_t^i$ represents the receiving time of the content $e_i^k$. The discarding time can be, for example, the time to move the content to a span folder or specify the content as unwanted. The bigger the second indicator $\tau_i$ is, the more possible the content $e_i^k$ is unwanted by the host $U_k$.

In addition, if $d_t^i - r_t^i \geq T$, the second indicator $\tau_i$ will not be counted.

Although the steps S302, S304, and S306 are described as being executed in a serial sequence in above description, a person skilled in the art will appreciate that the step S306 can be executed in parallel with the steps S302, S304.

Then at step S308, a detection result is obtained based on the traffic monitoring result that is represented by the first indicator $\phi^k$ the similarity of the contents $\text{sim\_in}^k$, and the behavior monitoring result which is represented by the second indicator $\tau_i$.

In an embodiment, the detection result can be represented by a value $v_k^i(t)$, which indicates the probability of the content $e_i^k$ being an unwanted content indicated by the host $U_k$ at time t. In an embodiment, the value $v_k^i(t)$ can be calculated as below:

$$v_k^i(t) = \text{sim\_in}^k * \phi^k * \tau_i \quad (5)$$

Back to FIG. 2, at step S204, the detection result is encrypted with a homomorphic encryption key. As described above, the network node should not know the detection result of the host, but the GTO should know it for the trust evaluation. So the homomorphic encryption key is not known to the network node and can be generated and issued by the GTO to the host.

In an embodiment, a pair of a homomorphic encryption key HE_PK and a homomorphic decryption key HE_SK is generated by the GTO based on Paillier cryptosystem, for example. Then the homomorphic encryption key HE_PK is issued to the related hosts and the host can use it to encrypt the detection result.

In order to avoid generating excessive detection reports, the detection result can be filtered by a second condition. For example, if the value of detection result $v_k^i(t)$ is not less than a second predetermined threshold THR2 for triggering detection reporting, the detection result will be encrypted. Otherwise, the detection result is discarded.

Then at step S206, a detection report is generated. The detection report can comprise a first identifier of the host $U_k$, a second identifier of a source host which transmits the unwanted traffic to the host, a content identifier identifying the content of the unwanted traffic, and the encrypted detection result $HE(v_k^i(t))$.

In an embodiment, the first identifier can be a real identifier identifying the host or an anonymous identifier of the host. The real identifier can be an IP address of the host, for example. The anonymous identifier can hide the real identifier of the host so that a receiver cannot know the real identifier, and can also identify the host uniquely. For example, the anonymous identifier can be a hash code of the real identifier. In addition, the anonymous identifier of the host can be obtained by coding the real identifier in a specific way known to the network node but unknown to the GTO.

The source host can be the host that is complained by the host to transmit the unwanted traffic. The second identifier can be a real identifier identifying the source host or an anonymous identifier of the source host. In an embodiment, the real identifier can be an IP address of the source host, and the anonymous identifier can be a hash code of the IP address of the source host.

The content identifier is used to identify the unwanted traffic and can be a hash code of the content. In the above description, $e_i^k$ can be the content identifier.

So the detection report can be represented as $R(k)=\{k, HE(v_k^i(t)), k',i,t\}$, wherein k is the first identifier of the host, k' is the second identifier of the source host, i represents the content identifier, t represents the reporting time of the host, and $HE(v_k^i(t))$ is the encrypted detection result.

Upon the generation of the detection report, at step S208, the detection report is signed with a private key of a Public Key Infrastructure (PKI) public/private key pair of the host, and thus the detection report has a digital signature. Then the detection report with the digital signature will be sent automatically to the network node to which the host subscribes.

The digital signature can be used to address the problem of non-repudiation and ensure integrity of the detection report. In the embodiment, the signature is signed on the hash code of the detection report.

The host can generate its own PKI public/private key pair, and share the public key with the network node to which the host subscribes. The network node can use the public key to verify the digital signature upon receipt of the detection report of the host.

Figure 4:
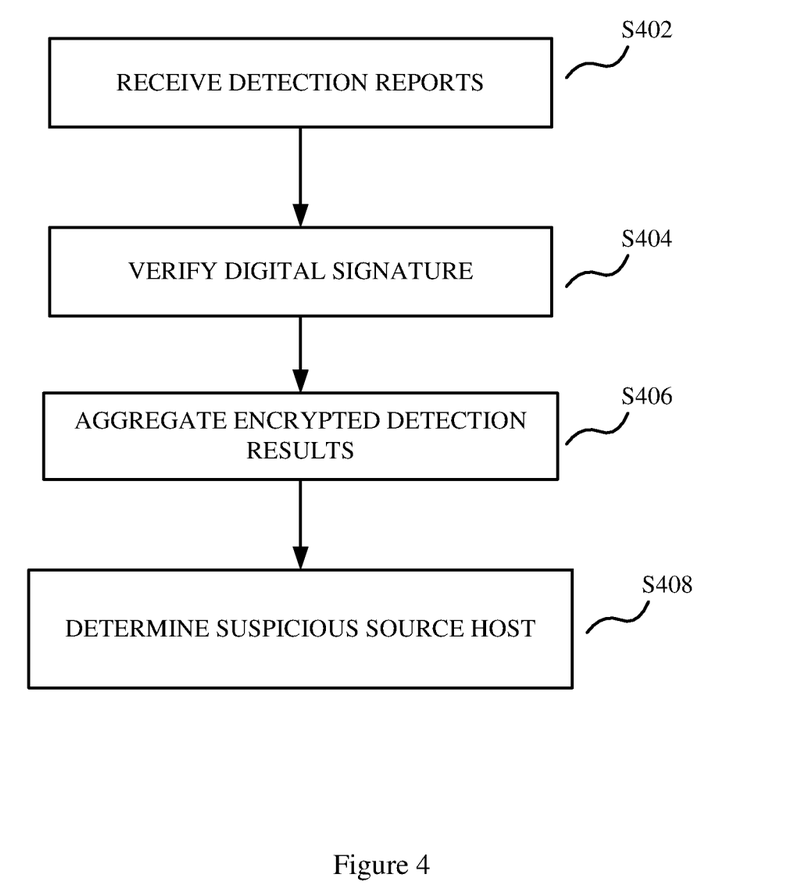
FIG. 4 is a flowchart illustrating the method for control of unwanted network traffic according to a second embodiment of the present invention.

FIG. 4 shows a flowchart illustrating the method for control of unwanted network traffic according to a second embodiment of the present invention. In the embodiment, the method is executed at or by the network node.

As shown in FIG. 4, at step S402, the detection reports are received at the network node from the hosts that subscribe to the network. The detection report has a digital signature signed by the host.

As described above, the detection report comprises the first identifier of the host, the second identifier of the source host, the content identifier, and the encrypted detection result. The encrypted detection result is based on the homomorphic encryption key HE_PK.

Then at step S404, the digital signature of the respective detection reports is verified. As described above, the host shares its public key of the PKI public/private key pair with the network node, the network node can use the host's public key to verify the digital signature signed by the host.

The network node decrypts the detection report with the public key of the host, and calculates hash code of the detection report locally. If the received decrypted hash code matches the locally calculated hash code, it means that the detection report is really sent by the host that shares the public key with the network node, and the digital signature is valid.

As the network node does not know the homomorphic encryption key, the network node cannot decrypt the encrypted detection result and thus cannot know the content of the detection report. Based on the above fact, the network node cannot find a suspicious source host by itself. In the embodiment, the network node cooperates with the GTO to determine the suspicious source host.

At step S406, the network node aggregates the encrypted detection results of the detection reports related to the same source host. The network node can determine which detection reports relate to the same source host based on the second identifier of the source host and the content identifier. Then the network node can perform addition, multiplication and division on the encrypted detection results to obtain the aggregation result.

As the detection result is encrypted with the homomorphic encryption key, the aggregation result of the encrypted detection results can be decrypted as the aggregation result of the original detection results with the corresponding homomorphic decryption key.

Generally, the homomorphic encryption scheme has properties of homomorphic addition and homomorphic constant multiplication. Specifically, the homomorphic encryption has the following characteristics:

$$E(\Sigma_{i=1}^n m_i) = \Pi_{i=1}^n E(m_i)$$

$$E(m \times k) = E(m)^k$$

wherein $E(\bullet)$ represents an encryption function with a homomorphic encryption key HE_PK, $m_i$ represents plaintext to be encrypted, $E(m_i) \neq 0$. Correspondingly, the homomorphic decryption has the following characteristics:

$$D\{\Pi_{i=1}^n E(m_i)\} = \Sigma_{i=1}^n m_i$$

$$D\{E(m)^k\} = m \times k$$

wherein $D(\bullet)$ represents an decryption function with a homomorphic decryption key HE_SK corresponding to the homomorphic encryption key HE_PK.

Paillier cryptosystem is an example of the homomorphic encryption scheme that has the above mentioned characteristics.

In the embodiment, the network node computes the aggregation result $s\_e_i(t)$ based on the encrypted detection results $HE(v_k^i(t))$ as below:

$$s\_e(t) = \Sigma_k HE(v_k^i(t)) * ut_k^t * dt_k^t / \Sigma_k ut_k^t * dt_k^t \qquad (6)$$

wherein $ut_k^t$ is a value of global trust of the host $U_k$ at time t, $dt_k^t$ is a value of detection trust of the host $U_k$ at time t. The details about the global trust and detection trust will be described later.

Then at step S408, the network node determines the suspicious source host to be monitored based on the aggregation result. In the embodiment, the determination condition is that the aggregation result of the detection results satisfies a predetermined condition. However the network node cannot aggregate the detection results as it does not know the detection result. The network node should cooperate with the GTO, which can know the detection results to find the suspicious source host.

In the step, the network node sends the aggregation result and the anonymous identifier of the source host to the GTO. As described above, in order to preserve privacy, the GTO should not know the real identifier of the network entity. So the anonymous identifier of the source host is sent to the GTO.

If the second identifier of the source host in the detection report is the real identifier of the source host, the network node will compute a hash code of the second identifier as the anonymous identifier of the source host.

Then the network node can receive from the GTO a determination result that indicates whether the source host is the suspicious source host and the anonymous identifier of the source host. The determination process of the suspicious source host at the GTO will be described later. If the source host is the suspicious source host, the network node checks whether the source host subscribes to the network node. The network node can perform the hash processing on the identifiers of the hosts in its log and compares the hash code as the anonymous identifier of the suspicious source host with the calculated hash code to determine whether the suspicious source host subscribes to the network node.

After determining the suspicious source host, the network node can take any action on the suspicious source host. For example, the network node may take administrative action or impose contractual penalties on the suspicious source host.

Figure 5:
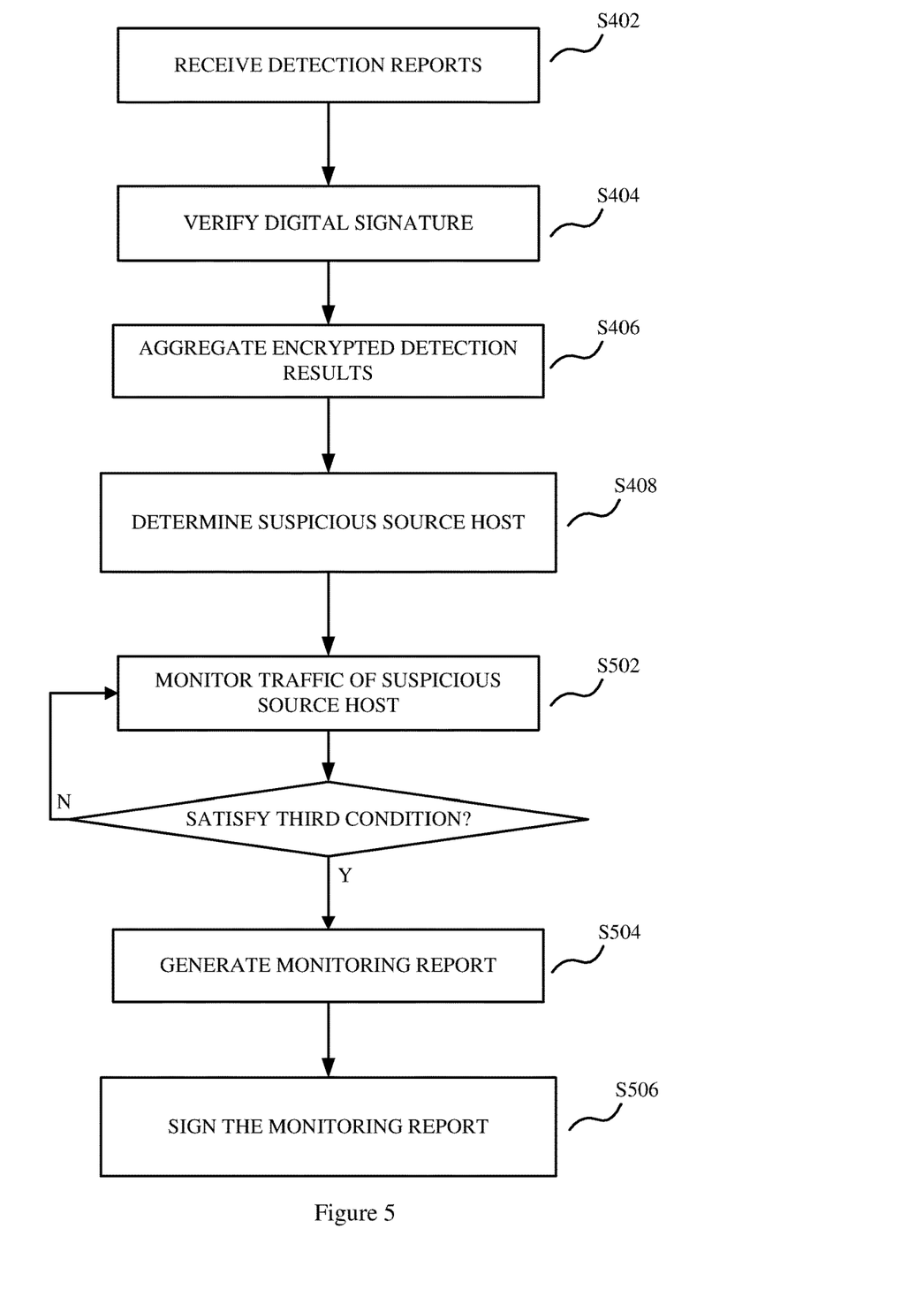
FIG. 5 is a flowchart illustrating the method for control of unwanted network traffic according to a third embodiment of the present invention.

In another embodiment as shown in FIG. 5, upon determination of the suspicious source host (step S408), the network node monitors the traffic flowing through the suspicious source host (step S502). The traffic monitoring of the suspicious source host is similar to the detection of unwanted traffic at the host.

The purpose of monitoring the traffic of the suspicious source host is to further find the true unwanted traffic source with certain credibility. The network node monitors outbound traffic of the suspicious source host $U_{k'}$. The traffic monitoring result can be represented by a third indicator $\varphi_{sp}^{k'}(t)$ as below:

$$\varphi_{sp}^{k'}(t)=|1-2f\{d_t[tr_k^o(t)]\}| \qquad (7)$$

wherein $tr_k^o(t)$ is the outbound traffic of the suspicious host $U_{k'}$ at time t.

Then the network node checks the similarity of contents of the outbound traffic. Similar to formula (3), the similarity of M sets of similar contents transmitted from the suspicious source host $U_{k'}$ can be calculated as:

$$\text{sim\_out}^{k'} = \frac{1}{M}\sum_M\left[\theta(I)/I - 1\sum_{i'\neq i}^{I}(1-|e_i^k - e_{i'}^k|)\right] \qquad (8)$$

Then the monitoring result about the suspicious source host $U_{k'}$ by the network node n can be obtained based on the traffic monitoring result and the similarity of the contents. In the embodiment, the monitoring result can be represented by a value $sp_k^n(t)$ that can be calculated as below:

$$sp_k^n(t) = \varphi_{sp}^{k'}(t) * \text{sim\_out}^{k'} \qquad (9)$$

Then at step S504, if the monitoring result $sp_k^n(t)$ satisfies a third condition, for example, the monitoring result $sp_k^n(t)$ is not less than a third predetermined threshold THR3 for triggering monitoring reporting, a monitoring report is generated. The monitoring report can comprises a third identifier of the network node, the monitoring result for the suspicious source host, a fourth identifier of the suspicious source host, and the encrypted detection results related to the suspicious source host from different hosts. The third identifier and the fourth identifier are the anonymous identifier. In an embodiment, the third identifier of the network node can be a hash code of the IP address of the network node, the fourth identifier of the suspicious source host can be the hash code of the IP address of the suspicious source host.

So the monitoring report can be represented as R(n)={n, $sp_{k'}^n(t)$,k', $HE(v_k^i(t),t\}$, wherein n represents the third identifier of the network node, $sp_{k'}^n(t)$ represents the monitoring result, k' represents the fourth identifier of the suspicious source host $U_{k'}$, and $HE(v_k^i(t))$ represents the encrypted detection result related to the suspicious source host from the host $U_k$.

If the monitoring result $sp_k^n(t)$ does not satisfy the third condition, it proceeds to step S502 at which the network node continues monitoring the traffic of the suspicious source host.

Then at step S506, the monitoring report is signed with a private key of a Public Key Infrastructure (PKI) public/private key pair of the network node, and thus the monitoring report has a digital signature. In the embodiment, the signature is signed on the hash code of the monitoring report. Then the monitoring report with the digital signature will be sent to the GTO for trust evaluation.

The network node can generate its own PKI public/private key pair, and share the public key with the GTO. The GTO can use the public key of the network node to verify the digital signature upon receipt of the monitoring report from the network node.

Figure 6:
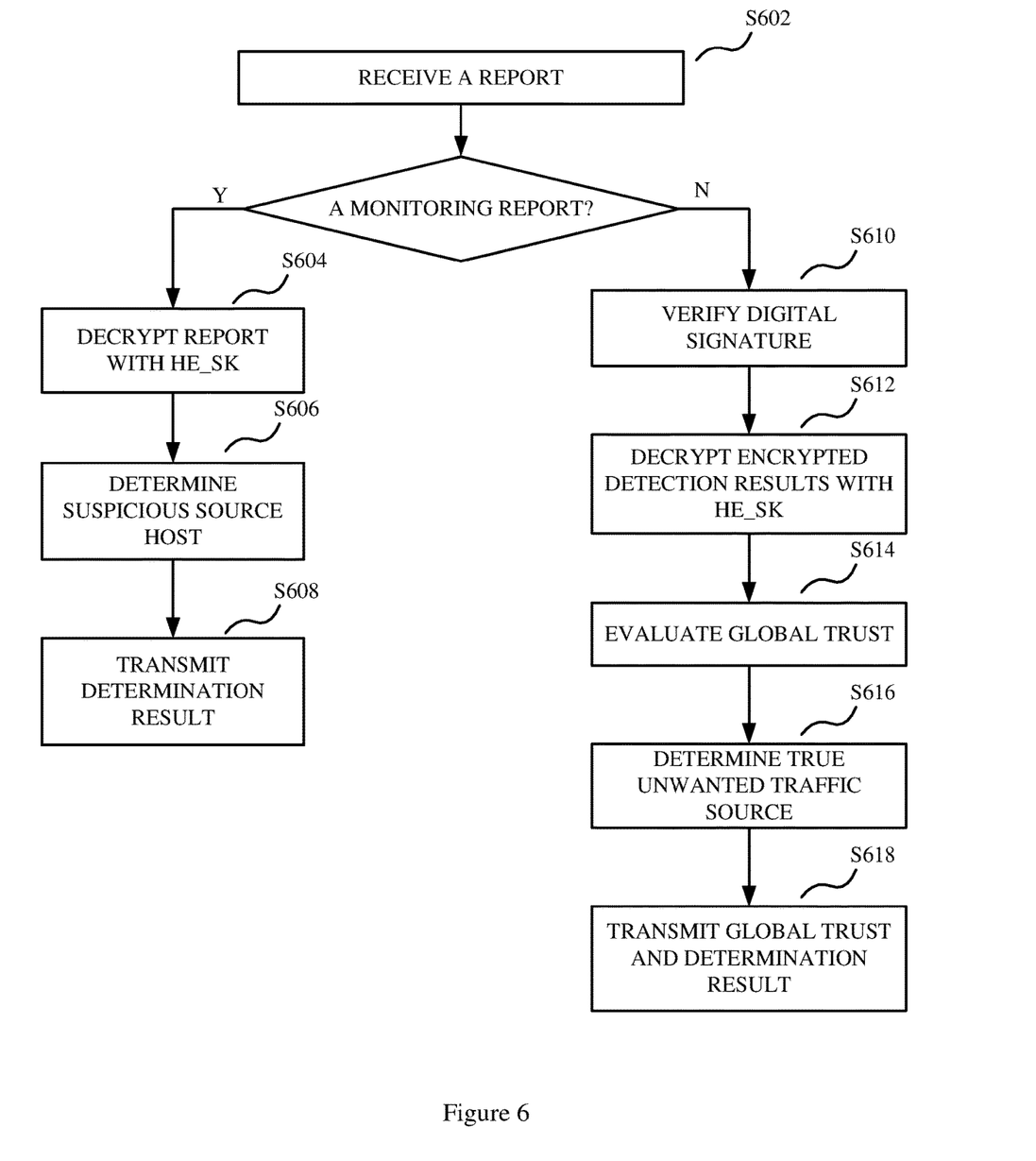
FIG. 6 is a flowchart illustrating the method for control of unwanted network traffic according to a fourth embodiment of the present invention.

FIG. 6 is a flowchart illustrating the method for control of unwanted network traffic according to a fourth embodiment of the present invention. In the embodiment, the method is executed at or by the entity GTO.

In the embodiment, the GTO mainly implements two processes, i.e. to determine the suspicious source host based on the aggregation result from the network node, and to determine the true unwanted traffic source based on the monitoring reports on the suspicious source host from the network nodes. During the two processes, the GTO only knows the contents of the detection reports, and cannot know the real identifiers of the reporting hosts and network nodes.

As shown in FIG. 6, at step S602, a report is received from the network node. Then it is determined whether the received report is the monitoring report.

If the report contains the aggregation result of the encrypted detection results related to the same source host and the anonymous identifier of the source host, at step S604, the report is decrypted with the homomorphic decryption key HE_SK. As described above, the GTO can generate a pair of homomorphic encryption key HE_PK and homomorphic decryption key HE_SK, and share the homomorphic encryption key HE_PK with the hosts. The host can use the homomorphic encryption key HE_PK to encrypt the detection result, and then the network host computes the aggregation result of the encrypted detection results. Accordingly the GTO can use the homomorphic decryption key HE_SK to decrypt the aggregation result of the encrypted detection results to obtain the aggregation result of the detection results.

Due to the anonymous identifier of the source host, the GTO will not know the real identifier of the source host.

Then at step S606, it is determined whether the source host is the suspicious source host to be monitored based on the decrypted aggregation result. As described above, the aggregation result of encrypted detection results can be represented as $s\_e_i(t)$, the decrypted aggregation result can be represented as $s_i(t)$. The network node compares the decrypted aggregation result $s_i(t)$ with a predetermined threshold THR5 for triggering monitoring at the network node. If the decrypted aggregation result is not less than the predetermined threshold THR5 (corresponding to "a fifth condition"), the source host is determined as the suspicious source host. If the decrypted aggregation result is less than the predetermined threshold THR5, the source host is not determined as the suspicious source host.

In an embodiment, the determination result can be represented by an indicator $si_{k'}$. If $s_i(t) \geq \text{thr0}$, $si_{k'}=1$, which indicates the source host is the suspicious source host. If $s_i(t)<thr0$, $si_{k'}=0$, which indicates the source host is not the suspicious source host.

The determination result and the anonymous identifier of the source host are transmitted to the network node, at step S608, so that the network node can monitor the traffic of the suspicious source host. In addition, the determination result and the anonymous identifier of the source host can also be transmitted to all the network nodes connected to the GTO to trigger monitoring the traffic of the suspicious source host at different network nodes.

If the received report is the monitoring report with the digital signature, at step S610, the GTO verifies the signature. As described above, the network node generates its own PKI public/private key pair and shares the public key with the GTO. So the GTO can use the public key of the network node to decrypt the monitoring report, and calculate the hash code of the monitoring report. If the received decrypted hash code of the monitoring report matches the calculated hash code, the signature is verified as being valid.

Note that the GTO can receive multiple monitoring reports from different network nodes connected to the GTO, and the received monitoring reports may relate to the same suspicious source host. In the following description, assume the GTO receives the monitoring reports about the suspicious source host $U_k$, from N network nodes, and these monitoring reports includes the encrypted detection results related to the suspicious source host $U_k$, from K1 hosts.

At step S612, the encrypted detection results included in the monitoring report are decrypted with the homomorphic decryption key HE_SK.

Then at step S614, a global trust is evaluated for the suspicious source host based on the detection results from K1 hosts and the monitoring results from N network nodes. In the embodiment, the global trust is used to indicate a possibility of the suspicious source host being a true unwanted traffic source.

Figure 7:
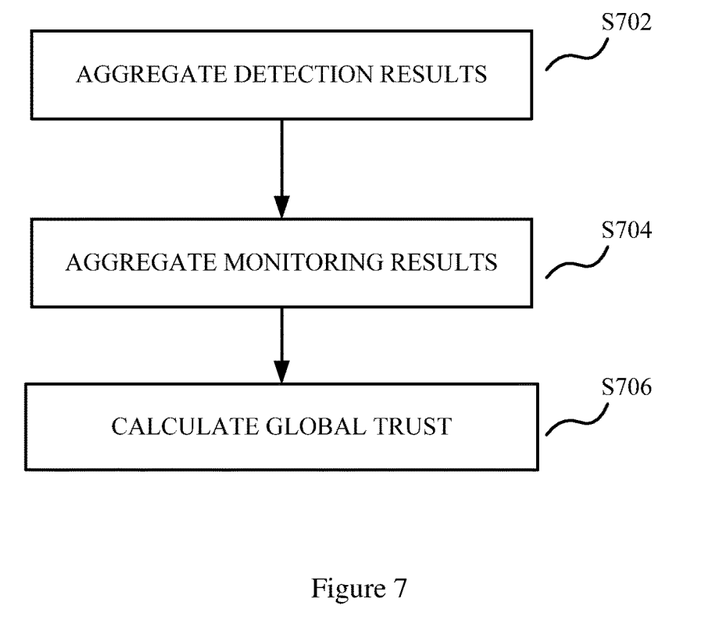
FIG. 7 is a flowchart illustrating a procedure of evaluating the global trust as shown in FIG. 6.

FIG. 7 shows a flowchart illustrating the process of evaluating the global trust. As shown in FIG. 7, at step S702, the detection results from K1 hosts are aggregated. The host $U_k(k=1, \ldots, K1)$ could report the detection report many time at different time t. Considering the time's influence, recent detection reports will be considered. So in the embodiment, a time decaying factor $e^{-|t-t_p|^2/\tau}$ is used to decay the detection result $v_k^i(t)$, wherein $t_p$ is the trust evaluation time, and $\tau$ is a parameter to control the time decaying. The aggregation result of the detection results from K1 hosts can be represented as below:

$$rt_{k'}^{t_p} = \sum_{k=1}^{K1} dt_k^{t_p} * ut_k^{t_p} * v_k^i(t) * e^{-\frac{|t-t_p|^2}{\tau}} / \sum_{k=1}^{K1} dt_k^{t_p} * ut_k^{t_p} * e^{-\frac{|t-t_p|^2}{\tau}} \quad (10)$$

wherein $dt_k^{t_p}$ is the value of detection trust of the host $U_k$ at time $t_p$, $ut_k^{t_p}$ is the value of global trust of the host $U_k$ at time $t_p$. Note that the values of the global trust and detection trust of the host in formulas (6) and (10) actually can use the last evaluated values of the host.

Then at step S704, the monitoring results from N network nodes are aggregated. As the reporting from the network nodes will immediately trigger the trust evaluation at the GTO, the time decaying will be ignored. In the embodiment, the aggregation result of the monitoring results can be represented as below:

$$mt_{k'}^{t_p} = \sum_{n=1}^{N} dt_n^{t_p} * ut_n^{t_p} * sp_{k'}^{n}(t_p) / \sum_{n=1}^{N} dt_n^{t_p} * ut_n^{t_p} \quad (11)$$

wherein $dt_n^{t_p}$ is the value of detection trust of the network node n at time $t_p$, $ut_n^{t_p}$ is the value of global trust of the network node n at time $t_p$, $sp_k^n(t_p)$ represents the monitoring result regarding the suspicious source host $U_{k'}$ from the network node n. Note that the values of the global trust and detection trust of the network node in formula (11) actually can use the last evaluated values of the network node.

At step S706, the global trust is calculated based on the aggregation result of the detection results and the aggregation result of the monitoring results. In the embodiment, the value of the global trust can be calculated by deducting the aggregation results of the detection results and monitoring results from the last evaluated value of global trust. Considering the number of the hosts and network nodes, the value of global trust can be calculated as below:

$$ut_k^{t_p} = ut_{k'} - \theta(K1)*rt_k^{t_p} - \theta(N)*mt_k^{t_p} \quad (12)$$

wherein $\theta(\bullet)$ is the Rayleigh cumulative distribution function, $ut_{k'}$ represents the last evaluated value of global trust. For each network entity (e.g., the host, the network node), the global trust may be initialized to 1, which means that the network entity is a good entity.

Although the evaluation of the global trust for the suspicious source host is described above in detail, a person skilled in the art will appreciate that the evaluation of the global trust for other hosts and the network nodes is similar. For the sake of simplicity, the global trust for the network node can always be set to 1.

In addition, in some embodiments, the detection trust can be removed from the formulas (10), (11).

Back to FIG. 6, at step S616, if the global trust for the suspicious source host satisfies a fourth condition, e.g. the global trust is less than a predetermined threshold THR4 for determining unwanted traffic source, the suspicious source host is determined as the true unwanted traffic source.

Then at step S618, the global trust and the identifier of the true unwanted traffic source are transmitted to all the network nodes. The network nodes can take any action on the true unwanted traffic source. Moreover, the evaluated global trust can be used by the network node in the aggregation of the encrypted detection results. In an embodiment, the identifier of the true unwanted traffic source can be added into a blacklist, and the blacklist and the global trust are provided to the network nodes. Note that the identifier of the true unwanted traffic source is its anonymous identifier, and the network nodes should find the real identifier of the true unwanted traffic source in order to perform traffic filtering and control.

Figure 8:
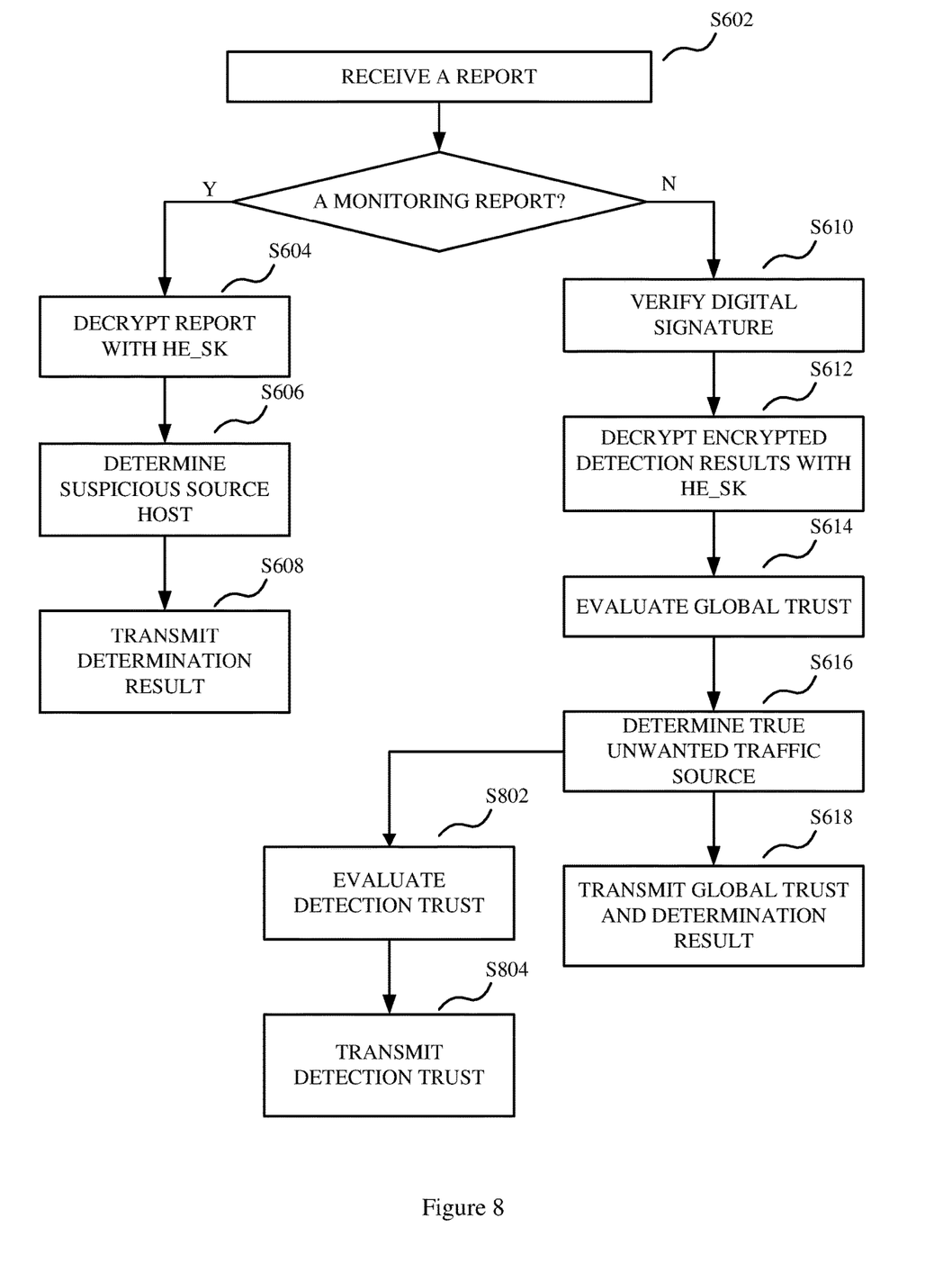
FIG. 8 is a flowchart illustrating the method for control of unwanted network traffic according to a fifth embodiment of the present invention.

In another embodiment as shown in FIG. 8, upon the determination of the true unwanted traffic source (step S616), at step S802, the GTO can execute evaluation of the detection trusts for the network nodes that send the monitoring reports and the hosts that send the detection reports. In the embodiment, the detection trust indicates a credibility of detection reporting for a host or a credibility of monitoring reporting for a network node. The host or network node may not report the correct detection result or monitoring result due to many reasons. For example, the host or network node may be intruded, or the host or network node intentionally frames other hosts, or detection tools installed in the host are broken, or the detection tools are poor and the detection is not qualified. These could lead to the decrease of the quality of detection or monitoring reports. The detection trust can be used to indicate the quality of detection or monitoring reports.

Now the process of evaluation of the detection trust is described as follows, which includes the evaluation of the detection trust for the respective hosts and the evaluation of the detection trust for the respective network nodes.

In the evaluation of detection trust for the host, firstly it is checked whether the detection result of the host matches the global trust of the true unwanted traffic source evaluated in step S614. It can be implemented by calculating a deviation between the detection result and the global trust, and comparing the deviation with a predetermined threshold thr1. If the deviation is less than the threshold thr1, it indicates that the detection result matches the global trust, and the detection trust for the host will be increased. If the deviation is larger than the threshold thr1, it indicates that the detection result does not match the global trust, and the detection trust will be decreased.

In an embodiment, the detection trust $dt_k^t$ for the host $U_k$ at time t can be calculated as below:

$$dt_k^t = \begin{cases} dt_k + \delta y & (\gamma < thr3) \\ dt_k + \delta y - \mu\gamma & (\gamma \geq thr3) \end{cases} = \begin{cases} 1 & (dt_k^t > 1) \\ 0 & (dt_k^t < 0) \end{cases} \quad (13)$$

wherein $dt_k$ represents the last evaluated detection trust, $\delta > 0$ is a parameter to control the change of the detection trust, y is a flag to indicate match or mismatch of the detection result, $\gamma$ is a warning flag to record the number of mismatched detection result, thr3 is a threshold to indicate the on-off and conflict behavior attacks, $\mu > 0$ is a parameter to control mismatched detection punishment. It can be seen that the detection trust is within a range [0, 1], and can be initialized to 0.5.

If the detection result matches the global trust, y=1 and $\gamma$ is not changed. If the detection result does not match the global trust, y=−1 and $\gamma$++. The initial value of $\gamma$ is 0.

The evaluation of the detection trust for the network node can be performed in the same way as the evaluation of the detection trust for the host as described above. A person skilled in the art will appreciate that the formula (13) is also applied to the calculation of the detection trust for the network node.

The evaluation of the detection trust for the host and the evaluation of the detection trust for the network node can be performed sequentially or concurrently.

Then at step S804, the detection trusts for the network nodes and the hosts are transmitted to all the network nodes. Thus the network nodes can use the latest detection trusts in the aggregation of the decrypted detection results.

Obviously a person skilled in the art will appreciate that the detection trusts can be transmitted together with the determination result of the true unwanted traffic source and the global trust.

With the methods of the embodiments as shown in FIGS. 2 to 8, the network node has no way to know the content of the detection report from the host, and only can perform aggregation on the encrypted detection reports without knowing the plaintext of the detection reports. The GTO can know the content of the detection report, but has no idea about the real identity of the hosts and network nodes. The anonymous identifier of the host and network node can ensure the identity privacy. The embodiments of the present invention can achieve privacy preservation on reporting and aggregation at the network node and achieve identity privacy preservation at the GTO. In addition, the embodiments of the present invention employs PKI scheme to ensure non-repudiation and integrity of reporting and employs homomorphic encryption scheme to ensure that the network node cannot access the content of the detection report and thus preserve the host's privacy.

Figure 9:
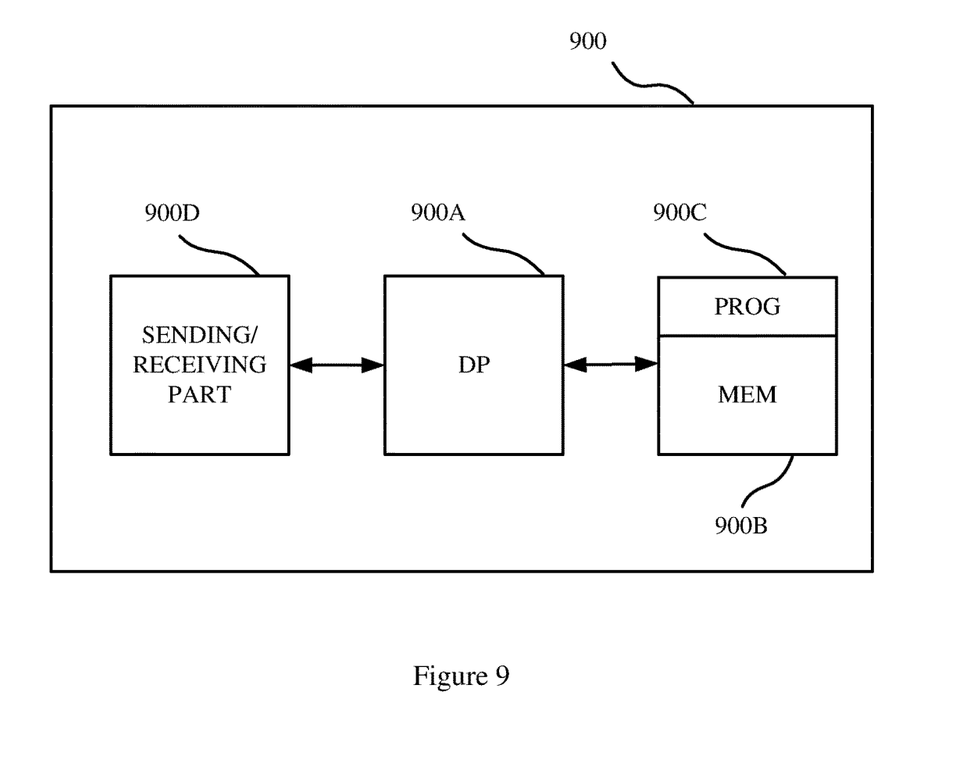
FIG. 9 is a schematic block diagram illustrating the apparatus for control of unwanted network traffic according to embodiments of the present invention.

FIG. 9 is a schematic block diagram illustrating the apparatus 900 according to embodiments of the present invention. In FIG. 9, the apparatus 900 may comprise a data processor (DP) 900A, a memory (MEM) 800B that stores a program (PROG) 900C, and a sending/receiving part 900D.

In an embodiment, at least one of the PROG 900C is assumed to comprise program instructions that, when executed by the associated DP 900A, enable the apparatus 900 to operate in accordance with the exemplary embodiment of the method shown in FIGS. 2, 3, as discussed above. That is, the exemplary embodiment of the method shown in FIG. 2, 3 may be implemented at least in part by computer software executable by the DP 900A of the apparatus 900, or by hardware, or by a combination of software and hardware.

In another embodiment, the program instructions can enable the apparatus 900 to operate in accordance with the exemplary embodiment of the method shown in FIG. 4, 5, as discussed above.

In another embodiment, the program instructions can enable the apparatus 900 to operate in accordance with the exemplary embodiment of the method shown in FIGS. 6 to 8, as discussed above.

The MEM 900B may be of any type suitable to the local technical environment and may be implemented using any suitable data storage technology, such as semiconductor based memory devices, flash memory, magnetic memory devices and systems, optical memory devices and systems, fixed memory and removable memory. The DP 900A may be of any type suitable to the local technical environment, and may comprise one or more of general purpose computers, special purpose computers, microprocessors, digital signal processors (DSPs) and processors based on multi-core processor architectures, as non-limiting examples.

In general, the various exemplary embodiments may be implemented in hardware or special purpose circuits, software, logic or any combination thereof. For example, some aspects may be implemented in hardware, while other aspects may be implemented in firmware or software that may be executed by a controller, microprocessor or other computing device, although the invention is not limited thereto. While various aspects of the exemplary embodiments of this invention may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the invention may be practiced in various components such as integrated circuit chips and modules. It should thus be appreciated that the exemplary embodiments of this invention may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this invention.

It should be appreciated that at least some aspects of the exemplary embodiments of the inventions may be embodied in computer-executable instructions, such as in one or more program modules, executed by one or more computers or other devices. Generally, program modules comprise routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by those skilled in the art, the functionality of the program modules may be combined or distributed as desired in various embodiments. In addition, the functionality may be embodied in whole or in part in firmware or hardware equivalents such as integrated circuits, field programmable gate arrays (FPGA), and the like.

The present invention comprises any novel feature or combination of features disclosed herein either explicitly or any generalization thereof. Various modifications and adaptations to the foregoing exemplary embodiments of this invention may become apparent to those skilled in the relevant arts in view of the foregoing description, when read in conjunction with the accompanying drawings. However, any and all modifications will still fall within the scope of the non-limiting and exemplary embodiments of this invention.

What is claimed is:

1. An apparatus comprising:
   at least one processor; and
   at least one memory including computer program code,
   the at least one memory and the computer program code configured to, with the at least one processor, cause the apparatus to perform at least the following:
   detect unwanted traffic flowing through a host which subscribes to a network node;
   encrypt a detection result for the unwanted traffic with a homomorphic encryption key that is unknown to the network node,
      wherein the homomorphic encryption key is associated with global trust evaluation of a source host;
   generate a detection report which contains a first identifier of the host, a second identifier of the source host which transmits the unwanted traffic to the host, a content identifier identifying content of the unwanted traffic, and the encrypted detection result; and
   sign the detection report by means of a Public Key Infrastructure (PKI) public/private key pair of the host.

2. The apparatus according to claim 1 wherein the at least one memory and the computer program code configured to, with the at least one processor, further cause the apparatus to:
   monitor inbound traffic of the host;
   in response to a traffic monitoring result satisfying a first condition, check similarity of two or more contents of the inbound traffic by performing a calculation on the two or more contents, wherein the calculation indicates a difference between the two or more contents;
   monitor behaviors of the host in processing the inbound traffic; and
   obtain a detection result based on the traffic monitoring result, the similarity of the two or more contents, and the behavior monitoring result.

3. The apparatus according to claim 1 wherein the first identifier is a real identifier identifying the host or an anonymous identifier of the host, and
   wherein the second identifier is a real identifier identifying the source host or an anonymous identifier of the source host, and
   wherein the content identifier is a hash code of the content.

4. The apparatus according to claim 3 wherein the anonymous identifier is a hash code of the real identifier.

5. The apparatus according to claim 1 wherein the detection result is encrypted in response to the detection result satisfying a second condition.

6. An apparatus comprising:
   at least one processor; and
   at least one memory including computer program code,
   the at least one memory and the computer program code configured to, with the at least one processor, cause the apparatus to perform at least the following:
   receive, from a host which subscribes to the apparatus, detection reports with a digital signature, the detection reports containing
      a first identifier of the host,
      a second identifier of a source host which transmits unwanted traffic to the host,
      a content identifier identifying content of the unwanted traffic, and
      an encrypted detection result for the unwanted traffic, the encrypted detection result being based on a homomorphic encryption key that is unknown to the apparatus,
         wherein the homomorphic encryption key is associated with global trust evaluation of the source host;
   verify the digital signature of the respective detection reports;
   aggregate the encrypted detection results of the detection reports related to a same source host; and
   determine a suspicious source host to be monitored based on an aggregation result of aggregating the encrypted detection results.

7. The apparatus according to claim 6 wherein the at least one memory and the computer program code configured to, with the at least one processor, cause the apparatus to further perform at least the following:
   monitor traffic flowing through the suspicious source host which subscribes to the apparatus;
   generate a monitoring report in response to a monitoring result of monitoring the traffic satisfying a third condition, the monitoring report containing a third identifier of the apparatus, the monitoring result for the suspicious source host, a fourth identifier of the suspicious source host, and the encrypted detection results regarding the suspicious source host; and
   sign the monitoring report by means of a Public Key Infrastructure (PKI) public/private key pair of the apparatus;
   wherein the third identifier is an anonymous identifier of the apparatus;
   wherein the fourth identifier is an anonymous identifier of the suspicious source host.

8. The apparatus according to claim 6 wherein the first identifier is a real identifier identifying the host or an anonymous identifier of the host, and
   wherein the second identifier is a real identifier identifying the source host or an anonymous identifier of the source host, and wherein the content identifier is a hash code of the content.

9. The apparatus according to claim 8 wherein the anonymous identifier is a hash code of the real identifier.

10. The apparatus according to claim 6 wherein the at least one memory and the computer program code configured to, with the at least one processor, cause the apparatus to determine a suspicious source host to be monitored based on the aggregation result by:
   send, to an entity which is different from the apparatus, the aggregation result and an anonymous identifier of the source host;
   receive, from the entity, a determination result which indicates whether the source host is a suspicious source host and the anonymous identifier of the source host; and
   check whether the suspicious source host subscribes to the apparatus.

11. The apparatus according to claim 7 wherein the at least one memory and the computer program code configured to, with the at least one processor, cause the apparatus to monitor traffic flowing through the suspicious source host which subscribes to the apparatus by:
   monitor outbound traffic of the suspicious source host;
   check similarity of two or more contents of the outbound traffic by performing a calculation on the two or more contents, wherein the calculation indicates a difference between the two or more contents; and
   obtain the monitoring result based on a traffic monitoring result and the similarity of the two or more contents.

12. An apparatus comprising:
   at least one processor; and
   at least one memory including computer program code, the at least one memory and the computer program code configured to, with the at least one processor, cause the apparatus to perform at least the following:
   receive, from a network node, a report;
   in response to the report containing an aggregation result of encrypted detection results related to a same source host and an anonymous identifier of the source host, the encrypted detection results being based on a homomorphic encryption key that is unknown to the network node, decrypt the aggregation result with a homomorphic decryption key which is paired with the homomorphic encryption key;
   determine whether the source host is a suspicious source host to be monitored based on the decrypted aggregation result;
   transmit a determination result and the anonymous identifier of the source host to the network node;
   in response to the report being a monitoring report with a digital signature, the monitoring report containing a third identifier of the network node, a monitoring result for a suspicious source host, a fourth identifier of the suspicious source host, and encrypted detection results regarding the suspicious source host, verify the digital signature;
   decrypt the encrypted detection results with the homomorphic decryption key;
   evaluate a global trust for the suspicious source host based on the detection results and the monitoring result;
   in response to the global trust satisfying a fourth condition, determine the suspicious source host is a true unwanted traffic source; and
   transmit the global trust and identifier of the true unwanted traffic source to the network node;
   wherein the third identifier is an anonymous identifier of the network node;
   wherein the fourth identifier is an anonymous identifier of the suspicious source host.

13. The apparatus according to claim 12 wherein the at least one memory and the computer program code configured to, with the at least one processor, cause the apparatus to further perform at least the following:
   evaluate detection trust for the network node based on the global trust of the true unwanted traffic source;
   evaluate detection trusts for respective hosts which provide the encrypted detection results based on the global trust of the true unwanted traffic source; and
   transmit the detection trusts to the network node.

14. The apparatus according to claim 12 wherein the at least one memory and the computer program code configured to, with the at least one processor, cause the apparatus to determine whether the source host is a suspicious source host to be monitored based on a decrypted result by:
   in response to the decrypted result satisfying a fifth condition, determine the source host is the suspicious source host; and
   in response to the decrypted result not satisfying the fifth condition, determine the source host is not the suspicious source host.

15. The apparatus according to claim 12 wherein the at least one memory and the computer program code configured to, with the at least one processor, cause the apparatus to evaluate a global trust of the suspicious source host by:
   aggregate the detection results;
   aggregate the monitoring results from different network nodes regarding the same suspicious source host; and
   calculate the global trust based on the aggregation result of the detection results and the aggregation result of the monitoring results.

16. The apparatus according to claim 13 wherein the at least one memory and the computer program code configured to, with the at least one processor, cause the apparatus to evaluate detection trust for the network node by:
   check whether the monitoring result of the network node matches the global trust of the true unwanted traffic source;
   in response to the monitoring result of the network node matching the global trust of the true unwanted traffic source, increase the detection trust of the network node; and
   in response to the monitoring result of the network node not matching the global trust of the true unwanted traffic source, decrease the detection trust of the network node.

17. The apparatus according to claim 13 wherein the at least one memory and the computer program code configured to, with the at least one processor, cause the apparatus to evaluate detection trusts for respective hosts which provide the encrypted detection results by:
   check whether the detection result of the source host matches the global trust of the true unwanted traffic source;
   in response to the detection result of the source host matching the global trust of the true unwanted traffic source, increase the detection trust of the network node; and
   in response to the detection result of the source host not matching the global trust of the true unwanted traffic source, decrease the detection trust of the network node.

* * * * *